(12) United States Patent
Petersen et al.

(10) Patent No.: US 11,131,821 B2
(45) Date of Patent: Sep. 28, 2021

(54) OPTIC FIBER CABLE FANOUT CONDUIT ARRANGEMENTS; COMPONENTS, AND METHODS

(71) Applicant: COMMSCOPE TECHNOLOGIES LLC, Hickory, NC (US)

(72) Inventors: Cyle D. Petersen, Belle Plaine, MN (US); Brent Campbell, Minneapolis, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 228 days.

(21) Appl. No.: 16/086,185

(22) PCT Filed: Mar. 17, 2017

(86) PCT No.: PCT/US2017/023027
§ 371 (c)(1),
(2) Date: Sep. 18, 2018

(87) PCT Pub. No.: WO2017/161310
PCT Pub. Date: Sep. 21, 2017

(65) Prior Publication Data
US 2020/0301090 A1 Sep. 24, 2020

Related U.S. Application Data

(60) Provisional application No. 62/310,268, filed on Mar. 18, 2016.

(51) Int. Cl.
*G02B 6/44* (2006.01)

(52) U.S. Cl.
CPC .................. *G02B 6/4472* (2013.01)

(58) Field of Classification Search
CPC ........................ G02B 6/4471; G02B 6/4472
See application file for complete search history.

(56) References Cited

U.S. PATENT DOCUMENTS

| | | |
|---|---|---|
| 4,299,244 A | 11/1981 | Hirai |
| 4,351,579 A | 9/1982 | Kordes et al. |
| 4,435,612 A | 3/1984 | Smith |
| 4,441,786 A | 4/1984 | Hulin et al. |

(Continued)

FOREIGN PATENT DOCUMENTS

| | | |
|---|---|---|
| AT | 408 698 B | 2/2002 |
| CN | 1289930 C | 12/2006 |

(Continued)

OTHER PUBLICATIONS

International Search Report and Written Opinion of the International Searching Authority for International Patent Application No. PCT/US2017/023027 dated May 24, 2017, 16 pages.

(Continued)

*Primary Examiner* — John Bedtelyon
(74) *Attorney, Agent, or Firm* — Merchant & Gould P.C.

(57) ABSTRACT

Fanout conduit arrangements, and systems and methods are provided to organize a plurality of optic fibers of an optic fiber cable. The arrangements include a fanout member having an inspection aperture arrangement therethrough, through which fibers can be inspected and a fixation media can be transferred to protect the fibers. Methods for assembling the fanout conduit arrangement are also provided.

20 Claims, 10 Drawing Sheets

(56) References Cited

U.S. PATENT DOCUMENTS

| | | |
|---|---|---|
| 4,453,291 A | 6/1984 | Fidych |
| 4,461,529 A | 7/1984 | Fariss |
| 4,582,067 A | 4/1986 | Silverstein et al. |
| 4,650,933 A | 3/1987 | Benda et al. |
| 4,684,211 A | 8/1987 | Weber et al. |
| 4,768,961 A | 9/1988 | Lau |
| 4,770,639 A | 9/1988 | Lau |
| 4,775,121 A | 10/1988 | Carty |
| 4,791,245 A | 12/1988 | Thornley |
| 4,797,114 A | 1/1989 | Lau |
| 4,820,200 A | 4/1989 | Lau |
| 4,840,568 A | 6/1989 | Burroughs et al. |
| 4,917,491 A | 4/1990 | Ring et al. |
| 5,083,346 A | 1/1992 | Orton |
| 5,133,583 A | 7/1992 | Wagman et al. |
| 5,135,265 A | 8/1992 | Bouscher et al. |
| 5,146,532 A | 9/1992 | Hodge |
| 5,189,410 A | 2/1993 | Kosugi et al. |
| 5,199,878 A | 4/1993 | Dewey et al. |
| 5,214,673 A | 5/1993 | Morgenstern et al. |
| 5,231,688 A | 7/1993 | Zimmer |
| 5,317,663 A | 5/1994 | Beard et al. |
| 5,339,379 A | 8/1994 | Kutsch et al. |
| 5,363,465 A | 11/1994 | korkowski et al. |
| 5,364,389 A | 11/1994 | Anderson |
| 5,381,501 A | 1/1995 | Cardinal et al. |
| 5,393,249 A | 2/1995 | Morgenstern et al. |
| 5,416,874 A | 5/1995 | Giebel et al. |
| 5,432,875 A | 7/1995 | Korkowski et al. |
| 5,467,062 A | 11/1995 | Burroughs |
| 5,473,718 A | 12/1995 | Sommer |
| 5,497,444 A | 3/1996 | Wheeler |
| 5,514,128 A | 5/1996 | Hillsman et al. |
| 5,554,026 A | 9/1996 | Van Hale |
| 5,582,525 A | 12/1996 | Louwagie et al. |
| 5,598,500 A | 1/1997 | Crespel |
| 5,613,030 A | 3/1997 | Hoffer et al. |
| 5,627,925 A | 5/1997 | Alferness et al. |
| 5,645,519 A | 7/1997 | Lee et al. |
| 5,649,042 A | 7/1997 | Saito |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,754,725 A | 5/1998 | Kuder et al. |
| 5,838,861 A | 11/1998 | Bunde |
| 5,863,083 A | 1/1999 | Giebel et al. |
| 5,879,075 A | 3/1999 | Conner et al. |
| 5,915,055 A | 6/1999 | Bennett et al. |
| 5,946,440 A | 8/1999 | Puetz |
| 5,970,195 A | 10/1999 | Brown |
| 6,072,932 A | 6/2000 | Bennett et al. |
| 6,104,855 A | 8/2000 | Jeon |
| 6,116,961 A | 9/2000 | Henneberger et al. |
| 6,208,796 B1 | 3/2001 | Vigliaturo |
| 6,226,111 B1 | 5/2001 | Chang et al. |
| 6,259,851 B1 | 7/2001 | Daoud |
| 6,263,136 B1 | 7/2001 | Jennings et al. |
| 6,278,831 B1 | 8/2001 | Henderson et al. |
| 6,307,998 B2 | 10/2001 | Vigliaturo |
| 6,328,608 B1 | 12/2001 | Olson et al. |
| 6,363,183 B1 | 3/2002 | Koh |
| 6,363,198 B1 | 3/2002 | Braga et al. |
| 6,370,294 B1 | 4/2002 | Pfeiffer et al. |
| 6,389,214 B1 | 5/2002 | Smith et al. |
| 6,418,262 B1 | 7/2002 | Puetz et al. |
| 6,421,493 B1 | 7/2002 | Burek et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,571,048 B1 | 5/2003 | Bechamps et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,614,979 B2 | 9/2003 | Bourdeau |
| 6,616,459 B2 | 9/2003 | Norris |
| 6,623,173 B1 | 9/2003 | Grois et al. |
| 6,632,106 B2 | 10/2003 | Musolf et al. |
| RE38,311 E | 11/2003 | Wheeler |
| 6,647,197 B1 | 11/2003 | Marrs et al. |
| 6,655,848 B2 | 12/2003 | Simmons et al. |
| 6,668,108 B1 | 12/2003 | Helkey et al. |
| 6,669,627 B1 | 12/2003 | Campbell et al. |
| 6,688,780 B2 | 2/2004 | Duran |
| 6,719,382 B2 | 4/2004 | Sucharczuk et al. |
| 6,738,555 B1 | 5/2004 | Cooke et al. |
| 6,760,531 B1 | 7/2004 | Solheid et al. |
| 6,761,594 B2 | 7/2004 | Johnsen et al. |
| 6,810,193 B1 | 10/2004 | Muller |
| 6,814,620 B1 | 11/2004 | Wu |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,867,668 B1 | 3/2005 | Dagostino et al. |
| 6,873,772 B2 | 3/2005 | Nakaya |
| 6,885,798 B2 | 4/2005 | Zimmel |
| 6,890,187 B2 | 5/2005 | Norris |
| 6,909,828 B2 | 6/2005 | Zimmel et al. |
| 6,937,807 B2 | 8/2005 | Franklin et al. |
| 6,983,095 B2 | 1/2006 | Reagan et al. |
| 6,993,237 B2 | 1/2006 | Cooke et al. |
| 7,029,322 B2 | 4/2006 | Ernst et al. |
| 7,035,510 B2 | 4/2006 | Zimmel et al. |
| 7,118,284 B2 | 10/2006 | Nakajima et al. |
| 7,121,732 B2 | 10/2006 | Pimpinella et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,221,832 B2 | 5/2007 | Tinucci |
| 7,228,047 B1 | 6/2007 | Szilagyi et al. |
| 7,233,731 B2 | 6/2007 | Solheid et al. |
| 7,269,319 B2 | 9/2007 | Zimmel |
| 7,270,485 B1 | 9/2007 | Robinson et al. |
| 7,277,614 B2 | 10/2007 | Cody et al. |
| 7,280,725 B2 | 10/2007 | Brown et al. |
| 7,303,220 B2 | 12/2007 | Zellak |
| 7,310,474 B2 | 12/2007 | Kanaski et al. |
| 7,333,606 B1 | 2/2008 | Swam et al. |
| 7,346,254 B2 | 3/2008 | Kramer et al. |
| 7,349,616 B1 | 3/2008 | Castonguay et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,418,186 B1 | 8/2008 | Grubish et al. |
| 7,440,669 B2 | 10/2008 | Tinucci |
| 7,453,706 B2 | 11/2008 | Clark et al. |
| 7,470,068 B2 | 12/2008 | Kahle et al. |
| 7,485,806 B1 | 2/2009 | Gretz |
| 7,495,931 B2 | 2/2009 | Clark et al. |
| 7,499,622 B2 | 3/2009 | Castonguay et al. |
| 7,606,459 B2 | 10/2009 | Zimmel et al. |
| 7,636,507 B2 | 12/2009 | Lu et al. |
| 7,641,396 B2 | 1/2010 | Feldner |
| 7,664,363 B1 | 2/2010 | Mowery, Sr. |
| 7,711,236 B2 | 5/2010 | Gonzalez et al. |
| 7,738,759 B2 | 6/2010 | Parikh et al. |
| 7,748,911 B2 | 7/2010 | Keenum et al. |
| 7,853,112 B2 | 12/2010 | Zimmel et al. |
| 7,885,505 B2 | 2/2011 | Zimmel |
| 7,912,336 B2 | 3/2011 | Zimmel |
| 7,933,484 B2 | 4/2011 | Hetzer et al. |
| 8,081,857 B2 | 12/2011 | Nair et al. |
| 8,172,465 B2 | 5/2012 | Kleeberger |

(56) References Cited

U.S. PATENT DOCUMENTS

| | | |
|---|---|---|
| 8,290,333 B2 | 10/2012 | Barlowe et al. |
| 8,346,045 B2 | 1/2013 | Zimmel et al. |
| 8,380,036 B2 | 2/2013 | Smith et al. |
| 8,573,855 B2 | 11/2013 | Nhep |
| 8,577,199 B2 | 11/2013 | Pierce et al. |
| 8,620,130 B2 | 12/2013 | Cooke et al. |
| 8,705,930 B2 * | 4/2014 | Lu .................. G02B 6/3878 385/137 |
| 8,737,786 B1 | 5/2014 | Compton et al. |
| 8,798,428 B2 | 8/2014 | Zimmel et al. |
| 8,824,841 B1 | 9/2014 | Mullen |
| 8,824,850 B2 | 9/2014 | Garcia et al. |
| 9,140,872 B2 | 9/2015 | Sedor et al. |
| 9,151,923 B2 | 10/2015 | Nielson et al. |
| 9,395,509 B2 | 7/2016 | Petersen et al. |
| 10,054,753 B2 | 8/2018 | Petersen et al. |
| 10,564,363 B1 | 2/2020 | Corl et al. |
| 2002/0037193 A1 | 3/2002 | Gibbons et al. |
| 2002/0062978 A1 | 5/2002 | Sakabe et al. |
| 2002/0131750 A1 | 9/2002 | Holman et al. |
| 2002/0141724 A1 | 10/2002 | Ogawa et al. |
| 2002/0181896 A1 | 12/2002 | McClellan et al. |
| 2003/0031423 A1 | 2/2003 | Zimmel |
| 2003/0031437 A1 | 2/2003 | Simmons et al. |
| 2003/0081916 A1 | 5/2003 | Norris |
| 2003/0122040 A1 | 7/2003 | Pisczak |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2003/0210875 A1 | 11/2003 | Wagner et al. |
| 2004/0094605 A1 | 5/2004 | Wild et al. |
| 2004/0126069 A1 | 7/2004 | Jong et al. |
| 2004/0141707 A1 | 7/2004 | Mozolowski |
| 2004/0156609 A1 | 8/2004 | Lanier et al. |
| 2004/0161970 A1 | 8/2004 | Wlos et al. |
| 2004/0184748 A1 | 9/2004 | Clatanoff et al. |
| 2004/0240826 A1 | 12/2004 | Daoud et al. |
| 2004/0266273 A1 | 12/2004 | Wu |
| 2005/0002633 A1 | 1/2005 | Solheid et al. |
| 2005/0003707 A1 | 1/2005 | Wu |
| 2005/0041926 A1 | 2/2005 | Elkins, II et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0111811 A1 | 5/2005 | Cooke et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0265668 A1 | 12/2005 | Martin |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0120672 A1 | 6/2006 | Cody et al. |
| 2006/0153516 A1 | 7/2006 | Napiorkowski et al. |
| 2006/0169469 A1 | 8/2006 | Eastwood et al. |
| 2006/0188210 A1 | 8/2006 | Zimmel |
| 2006/0233508 A1 | 10/2006 | Mann et al. |
| 2006/0269198 A1 | 11/2006 | Blazer et al. |
| 2006/0269205 A1 | 11/2006 | Zimmel |
| 2006/0269206 A1 | 11/2006 | Zimmel |
| 2006/0285807 A1 | 12/2006 | Lu et al. |
| 2007/0036503 A1 | 2/2007 | Solheid et al. |
| 2007/0047893 A1 | 3/2007 | Kramer et al. |
| 2007/0117437 A1 | 5/2007 | Boehnlein et al. |
| 2007/0147765 A1 | 6/2007 | Gniadek et al. |
| 2007/0172172 A1 | 7/2007 | Theuerkorn et al. |
| 2007/0189692 A1 | 8/2007 | Zimmel et al. |
| 2007/0212004 A1 | 9/2007 | Lu et al. |
| 2008/0026647 A1 | 1/2008 | Boehnlein et al. |
| 2008/0063351 A1 | 3/2008 | Elkins et al. |
| 2008/0124039 A1 | 5/2008 | Gniadek et al. |
| 2008/0138020 A1 | 6/2008 | Robinson et al. |
| 2008/0138026 A1 | 6/2008 | Yow et al. |
| 2008/0164059 A1 | 7/2008 | Cipolla |
| 2008/0175541 A1 | 7/2008 | Lu et al. |
| 2008/0248673 A1 | 10/2008 | Boehnlein et al. |
| 2008/0253730 A1 | 10/2008 | Cox et al. |
| 2008/0317415 A1 | 12/2008 | Hendrickson et al. |
| 2009/0002689 A1 | 1/2009 | Cobb, III et al. |
| 2009/0022468 A1 | 1/2009 | Zimmel |
| 2009/0022469 A1 | 1/2009 | Zimmel et al. |
| 2009/0035987 A1 | 2/2009 | Daly et al. |
| 2009/0060421 A1 | 3/2009 | Parikh et al. |
| 2009/0067804 A1 | 3/2009 | Knorr et al. |
| 2009/0103881 A1 | 4/2009 | Gonzalez et al. |
| 2009/0116806 A1 | 5/2009 | Zimmel et al. |
| 2009/0196553 A1 | 8/2009 | Anderson et al. |
| 2010/0027942 A1 | 2/2010 | Smith et al. |
| 2010/0030033 A1 | 2/2010 | Farley et al. |
| 2010/0054860 A1 | 3/2010 | Thompson et al. |
| 2010/0059229 A1 | 3/2010 | Smith et al. |
| 2010/0086260 A1 | 4/2010 | Parikh et al. |
| 2010/0092136 A1 | 4/2010 | Nhep |
| 2010/0150504 A1 | 6/2010 | Allen et al. |
| 2010/0158464 A1 | 6/2010 | Zimmel et al. |
| 2010/0215331 A1 | 8/2010 | Gonzalez et al. |
| 2010/0266244 A1 | 10/2010 | Lu et al. |
| 2011/0024103 A1 | 2/2011 | Storm et al. |
| 2011/0081121 A1 | 4/2011 | Le Dissez |
| 2011/0164853 A1 | 7/2011 | Corbille et al. |
| 2011/0182558 A1 | 7/2011 | Garcia et al. |
| 2011/0229098 A1 | 9/2011 | Abernathy et al. |
| 2011/0257563 A1 | 10/2011 | Thapliyal et al. |
| 2011/0262084 A1 | 10/2011 | Ott |
| 2011/0284285 A1 | 11/2011 | Miura et al. |
| 2011/0317975 A1 | 12/2011 | Lu et al. |
| 2012/0008909 A1 | 1/2012 | Mertesdorf et al. |
| 2012/0045178 A1 | 2/2012 | Theuerkorn |
| 2012/0186845 A1 | 7/2012 | Eshima et al. |
| 2012/0230636 A1 | 9/2012 | Blockley et al. |
| 2012/0301090 A1 | 11/2012 | Cline et al. |
| 2012/0328253 A1 | 12/2012 | Hurley et al. |
| 2013/0011105 A1 | 1/2013 | Barlowe et al. |
| 2013/0077928 A1 | 3/2013 | Hsing |
| 2013/0114937 A1 | 5/2013 | Zimmel et al. |
| 2013/0183012 A1 | 7/2013 | Cabanne Lopez et al. |
| 2013/0209042 A1 | 8/2013 | Belenky et al. |
| 2013/0209043 A1 | 8/2013 | Norris et al. |
| 2013/0294735 A1 | 11/2013 | Burris et al. |
| 2013/0330967 A1 | 12/2013 | Youtsey |
| 2014/0083229 A1 | 3/2014 | Kume |
| 2014/0093217 A1 | 4/2014 | Lu et al. |
| 2014/0126873 A1 | 5/2014 | Cooke et al. |
| 2014/0133823 A1 | 5/2014 | Simmons et al. |
| 2014/0140664 A1 | 5/2014 | Islam |
| 2014/0140671 A1 | 5/2014 | Islam |
| 2014/0219621 A1 | 8/2014 | Barnette, Jr. et al. |
| 2014/0233903 A1 | 8/2014 | Valderrabano |
| 2014/0241674 A1 | 8/2014 | Isenhour et al. |
| 2014/0248798 A1 | 9/2014 | Youtsey |
| 2015/0078720 A1 | 3/2015 | Sedor et al. |
| 2015/0110442 A1 | 4/2015 | Zimmel et al. |
| 2015/0155697 A1 | 6/2015 | Loveless et al. |
| 2015/0168657 A1 | 6/2015 | Islam |
| 2015/0226927 A1 | 8/2015 | Islam |
| 2015/0260936 A1 | 9/2015 | Newbury et al. |
| 2015/0284036 A1 | 10/2015 | Miles |
| 2015/0370029 A1 | 12/2015 | Petersen et al. |
| 2016/0004016 A1 | 1/2016 | Zimmel et al. |
| 2016/0139355 A1 | 5/2016 | Petersen |
| 2016/0178850 A1 | 6/2016 | Nhep |
| 2016/0363733 A1 | 12/2016 | Nielson et al. |
| 2017/0102506 A1 | 4/2017 | Newbury et al. |
| 2017/0212313 A1 | 7/2017 | Elenabaas et al. |
| 2017/0269319 A1 | 9/2017 | Miller |
| 2018/0149823 A1 | 5/2018 | Wang et al. |

(56) References Cited

U.S. PATENT DOCUMENTS

| | | |
|---|---|---|
| 2018/0196211 A1 | 7/2018 | Agata et al. |
| 2019/0004272 A1 | 1/2019 | Field |
| 2019/0056562 A1 | 2/2019 | Petersen |

FOREIGN PATENT DOCUMENTS

| | | |
|---|---|---|
| DE | 41 30 706 A1 | 3/1993 |
| DE | 14 05 459 A1 | 8/1995 |
| DE | 202 01 170 U1 | 5/2002 |
| DE | 102 07 337 A1 | 11/2002 |
| DE | 10 2004 019 805 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0 339 791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 1129287 A | 10/1968 |
| GB | 2 300 978 A | 11/1996 |
| JP | H01-317824 A | 12/1989 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2008059212 A1 | 5/2008 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/020076 A1 | 2/2017 |
| WO | 2018/044729 A1 | 3/2018 |
| WO | 2018/208518 A1 | 11/2018 |

OTHER PUBLICATIONS

Exhibit A: Fanout product by ADC Telecommunications, Inc., 2 pages, admitted as prior art as of Oct. 13, 2016.
Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
24 Fiber Transition Housing by ADC Telecommunications, Inc., 2 pages, admitted as prior art as of Jun. 25, 2010.
Extended European Search Report for European Patent Application No. 17767658.2 dated Jul. 23, 2019, 8 pages.

* cited by examiner

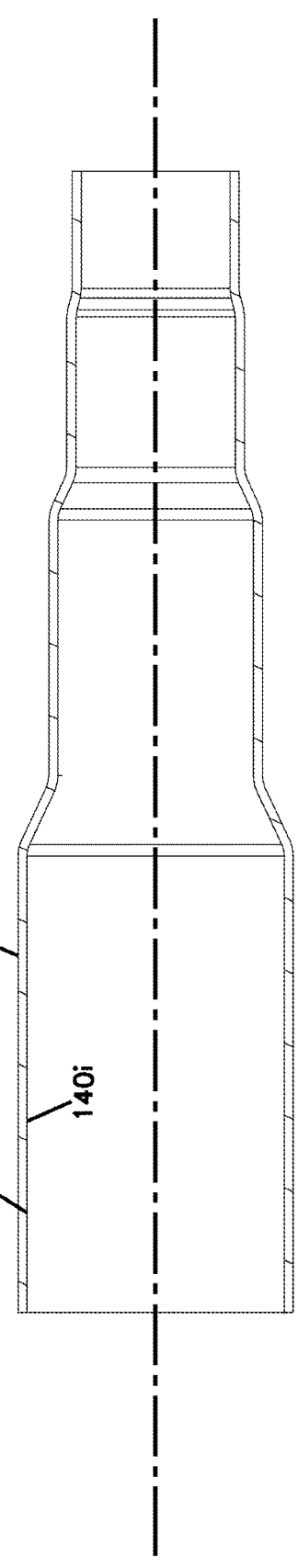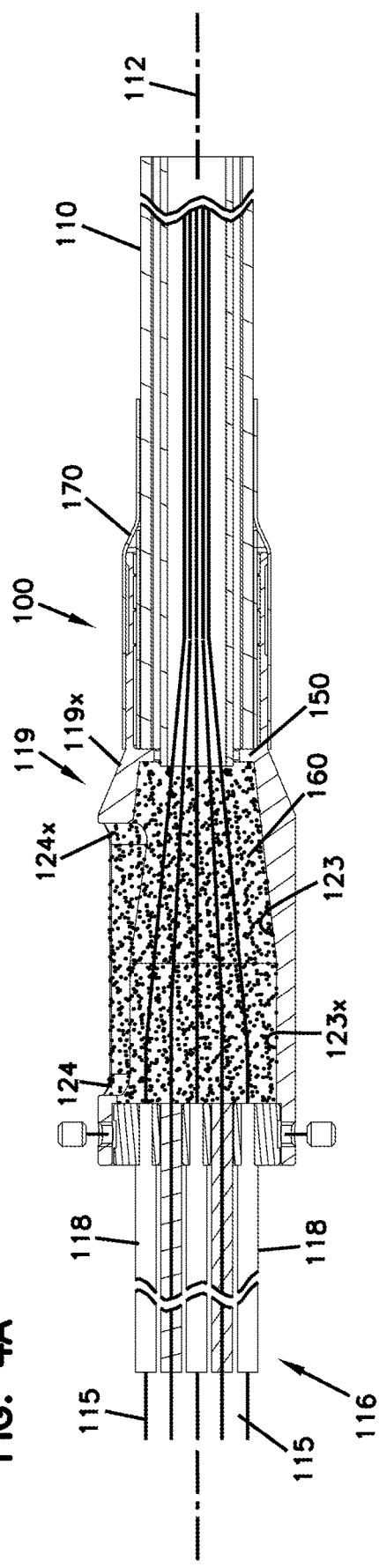

OPTIC FIBER CABLE FANOUT CONDUIT ARRANGEMENTS; COMPONENTS, AND METHODS

CROSS-REFERENCE TO RELATED APPLICATION

This application is a National Stage of PCT/US2017/023027, filed on Mar. 17, 2017, which claims the benefit of U.S. Patent Application Ser. No. 62/310,268, filed on Mar. 18, 2016, the disclosures of which are incorporated herein by reference in their entireties. To the extent appropriate, a claim of priority is made to each of the above disclosed applications.

FIELD OF INVENTION

This disclosure relates to fanout conduit arrangements for fiber optic cables; components thereof; and, methods of use and assembly.

BACKGROUND

The internal construction of fiber optic cables often comprises a plurality of optic fibers. A technician connects a cable fanout conduit arrangement to/on a fiber optic cable to manage the various optic fibers. The fanout arrangement organizes the fibers to facilitate management and maintenance, for example at a junction point.

Previous approaches have been developed to address optic fiber cable fanouts. Examples are described in such references as U.S. Pat. Nos. 8,705,930 and 8,573,855, each of which is incorporated herein by reference. Improvements are desired and provided herein.

SUMMARY

To manage transport and connection of optical fibers at a subsequent juncture point, optic fibers in a cable should be organized. Organizing optic fibers can include fanning out the fibers from a sheathed protection layer of the cable with a cable fanout assembly. Once the fibers are fanned out, the fibers are preferably channeled in a selected arrangement. The present disclosure is directed to systems, apparatus and methods for organization and management of the optic fibers in a cable fanout conduit arrangement.

One aspect of the disclosure relates to cable fanout conduit arrangement comprising a cable fanout assembly. The cable fanout assembly includes a cable fanout member and an endcap arrangement. The endcap arrangement is operationally (operably) positioned on an end of the fanout member. A section of the cable fanout member defines an inspection aperture arrangement. The inspection aperture arrangement provides an access point for the technician to examine fibers passing through the cable fanout member and for the technician to put a fill or fixation material into the cable fanout member to secure and protect the fiber(s).

Aspects of the disclosure also relate to optic fiber cables having such cable fanout assemblies thereon. Other aspects of the disclosure relate to methods for use and assembly.

BRIEF DESCRIPTION OF THE DRAWINGS

FIG. 3 being taken generally along line 3-3, FIG. 2.

FIG. 4 is schematic, fragmentary, cross-sectional view of an optional protective cover of a portion of the cable fanout conduit arrangement depicted in FIG. 3.

FIG. 4A is schematic, fragmentary, cross-sectional view of interior components of the cable fanout conduit arrangement depicted in FIG. 3.

DETAILED DESCRIPTION

I: General Fanout Assembly and Use

A. Brief Additional Description Relating to Optic Fiber Cable Fanout Conduit Arrangements and Issues A fiber optic cable typically includes a plurality of optic fibers. In some instances, fibers of the cable need to be accessed and/or managed. An optic fiber cable fanout conduit arrangement can be used to manage the fibers by fanning-out the fibers. The term "fanning-out" as used herein, in this context, references a process of organizing the fibers, typically by aligning them as the fibers pass a conduit arrangement.

Issues with cable fanout approaches relate to the following: ease of assembly in the field, ease of determining proper fiber alignment in the assembly and ease of securing with a satisfactory fiber alignment. The issues further include protecting fibers once fanned out during assembly and subsequent operations.

B. General Features of an Example Optic Fiber Cable Fanout Conduit Arrangement According to the Present Disclosure: FIGS. 1-4A

Figure 1:
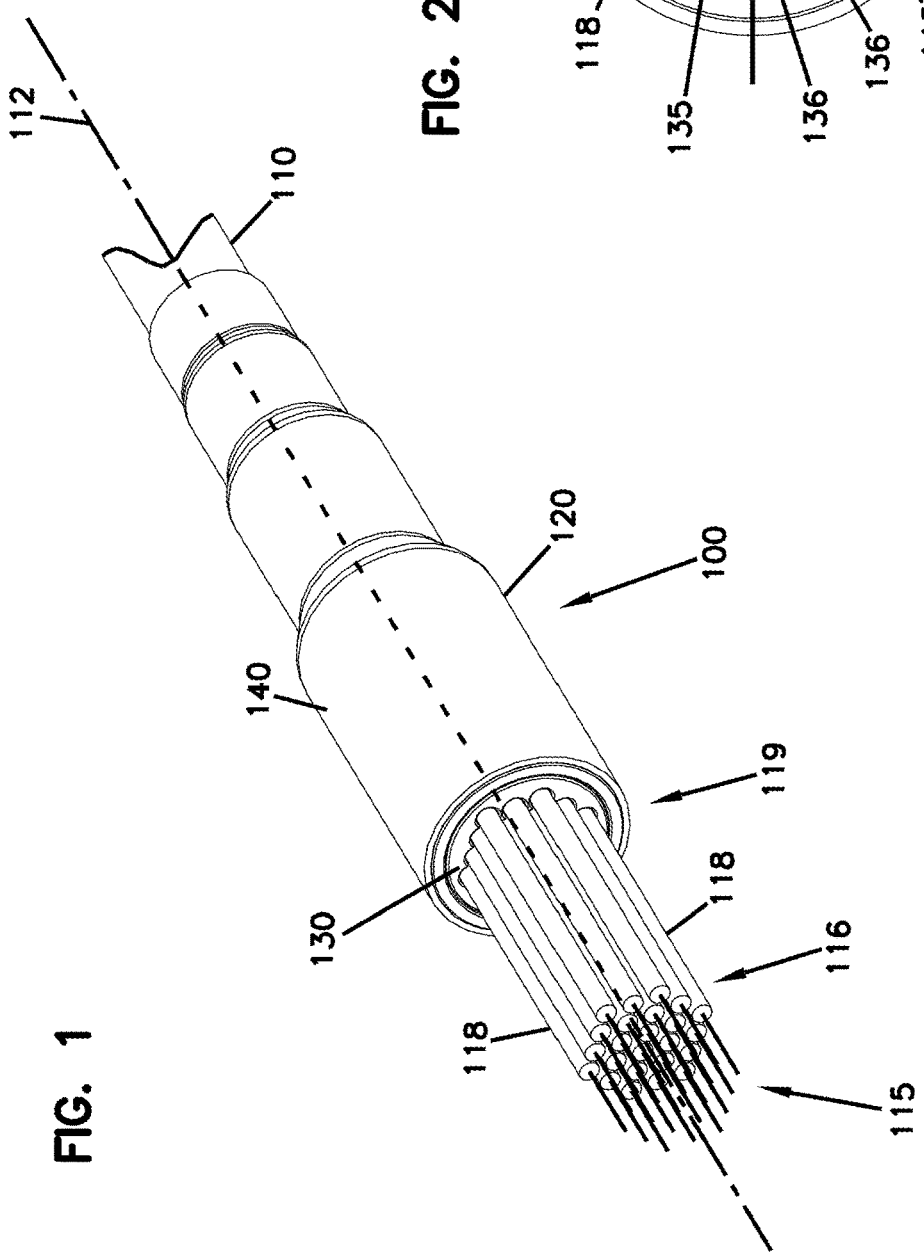
FIG. 1 is a schematic, fragmentary, perspective view of an optic fiber cable fanout conduit arrangement operably positioned on an optic fiber cable according to the present disclosure.

In FIG. 1, a schematic representation of an example optic fiber cable fanout conduit arrangement 100 according to the present disclosure is depicted operably positioned on an optic fiber cable 110 comprising a plurality of fibers 115. By "operably positioned" (or alternatively "operationally positioned") in this context, it is meant that the optic fiber cable fanout conduit arrangement 100 is depicted relative to the cable 110 as it would appear (schematically) in use. It is noted that with respect to the schematic view of FIG. 1, it is not meant to be suggested that any specific number of fibers 115 will be present in any given system and there can be variations from those shown. Also, specific sizes of the fibers 115 and/or size of the fibers 115 relative to one another, the cable 110 or other components are not meant to be specifically indicated. Thus, variations are possible.

More generally herein when "operably positioned" or "operationally position" with respect to a feature or feature is discussed, what is meant is that in-use the feature or features would be engaged generally as characterized.

The optic fiber cable fanout conduit arrangement 100 provides organization to the plurality of fibers 115 in the cable 110. Organizing the optic fibers 115 results in reduction and/or inhibition of undesirable bunching or tangling of optic fibers. The structure of the optic fiber cable fanout conduit arrangement 100 reduces fiber bunching by fanning out the fibers 115 and channeling the fibers into organizational substructures 116.

As the fibers 115 transition from the cable 110 to the organizational substructures 116, the fibers 115 exit a cable fanout assembly 119. Subsequent to exiting the cable fanout assembly 119, a technician can selectively manage the fibers 115 at junctions.

Referring to FIG. 1, the cable fanout assembly 119 comprises a cable fanout member 120 and a fiber-organizing endcap arrangement 130. The cable fanout conduit arrangement 119 depicted includes an optional covering 140 over the cable fanout member 120.

Figure 2:
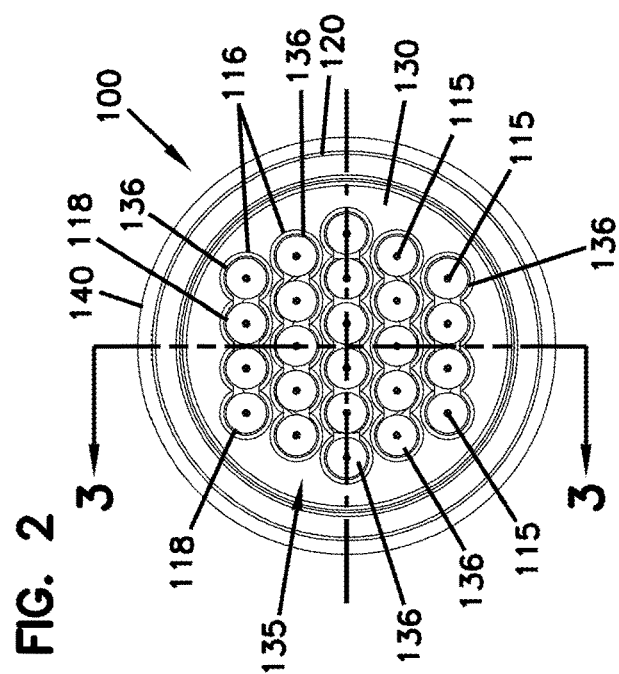
FIG. 2 is a schematic end view of the cable fanout conduit arrangement of FIG. 1.

FIG. 2 is the view of assembly 100 of FIG. 1 taken toward the fibers 115 as they exit the organizational substructures 116; in this instance the substructures 116 comprising a plurality of fiber furcation tubes 118. The fiber furcation tubes 118 are positioned on the fiber-organizing endcap arrangement 130 and provide organizing channels for the (fanned-out fibers) 115, as they are fanned-out and exit the cable fanout assembly 119. The fiber furcation tubes 118 protect the fibers 115 as the fibers 115 exit the cable fanout assembly 119. The lengths of the furcation tubes 118 and fibers 115 are variable and may be different than shown, with respect to a particular use. In general terms, the fiber-organizing endcap arrangement 130 in combination with the fiber furcation tubes 118 comprises the above referenced organizational substructure(s) 116. Typically, the fiber furcation tubes 118 are flexible, so a technician can direct them to selected functions.

Still referring to FIG. 2, the fiber-organizing endcap arrangement 130 comprises a fiber-organizing arrangement 135 that organizes the fiber furcation tubes 118 into a selected preferred pattern. The fiber-organizing arrangement 135 depicted comprises a tube-organizing arrangement comprising a plurality of tube-organizing grooves 136, discussed below.

The depicted furcation tubes 118 are uniform, but the furcation tubes 118 can vary in size or shape. In an example depicted, the furcation tubes 118 have circular cross-sections such that the related cross-dimensions are diameters. However, variations in geometric cross-section are possible. To accommodate possible variable cross-dimensions of the furcation tubes 118, the orientation of the tube-organizing grooves 136 can also be varied from the depicted embodiment.

Figure 3:
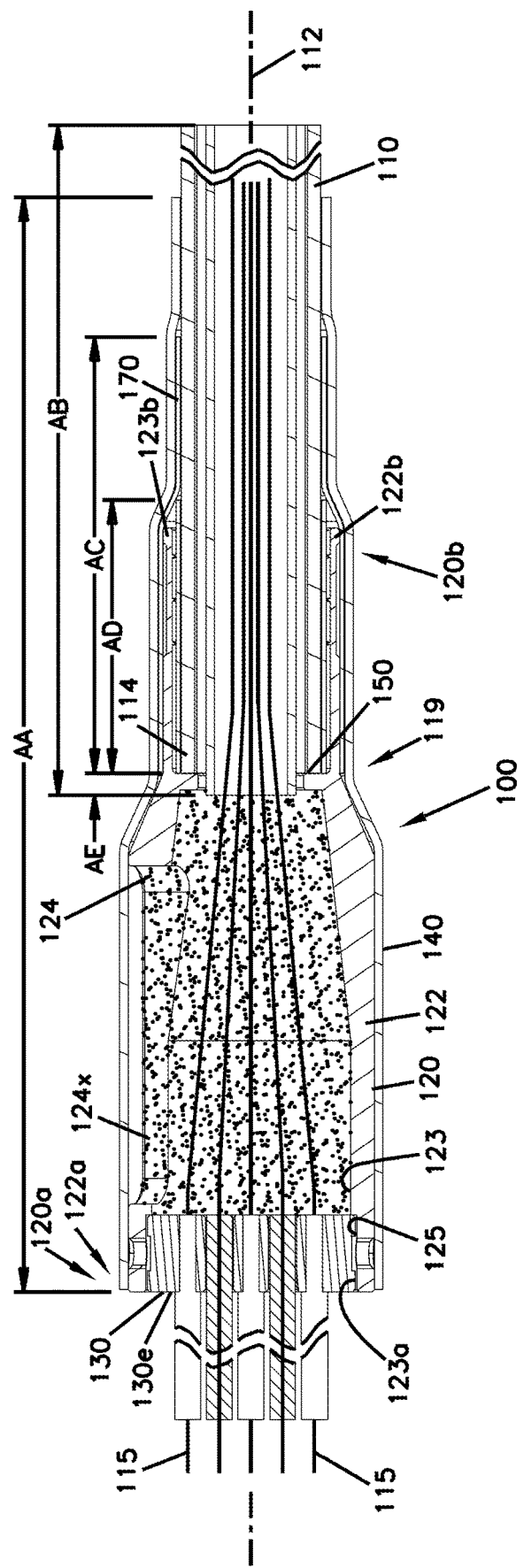
FIG. 3 is a schematic, fragmentary, cross-sectional view of the cable fanout conduit arrangement depicted in FIG. 1.

In FIG. 3, a schematic, fragmentary, cross-sectional view is provided, depicting the cable fanout conduit arrangement 100, i.e. assembly 119. The depicted cable fanout member 120 includes a cable fanout member sidewall 122. The cable fanout member 120 defines a conduit 123 extending between two opposite ends 122a, 122b of the cable fanout member sidewall 122 (i.e. the conduit 123 extends between corresponding opposite ends 120a and 120b of the cable fanout member 120). Thus the conduit 123 has corresponding opposite ends 123a and 123b. The conduit 123 serves as a passage for the cable 110 and optic fibers 115 through the optic fiber cable fanout conduit arrangement 100.

In the embodiment depicted, the conduit 123 extends between the two opposite ends 123a and 123b along a linear central axis 112. The central axis 112 can be a center axis of the conduit 123, for example when the conduit 123 is circular in cross-section. However, alternatives are possible. In some applications, the central axis 112 can be non-linear in extension between the two opposite conduit ends 123a, 123b, although this typically will not be preferred.

In the example depicted, the end 122a of the cable fanout member sidewall 122 is an end that the fanned-out fibers 115 exit. The end 122a defines a fiber-organizing endcap arrangement receiver 125. The cable fiber-organizing endcap arrangement 130 is operably positioned at (on) the fiber-organizing endcap arrangement receiver 125. In the depicted example the fiber-organizing endcap arrangement receiver 125 surrounds the cable fiber-organizing endcap arrangement 130; however, alternatives are possible.

Still referring to FIG. 3, the example embodiment fiber-organizing endcap arrangement 130 includes an exterior, end, surface 130e. The exterior surface 130e is the surface from which the fibers 115 exit the cable fanout assembly 119. In the example embodiment, the exterior surface 130e of fiber-organizing endcap arrangement 130 is flush (or nearly flush) with the end 122a of the fiber-organizing endcap arrangement receiver 125. However, alternatives are possible. For example, the surface 130 can be recessed within conduit 123.

Figure 3A:
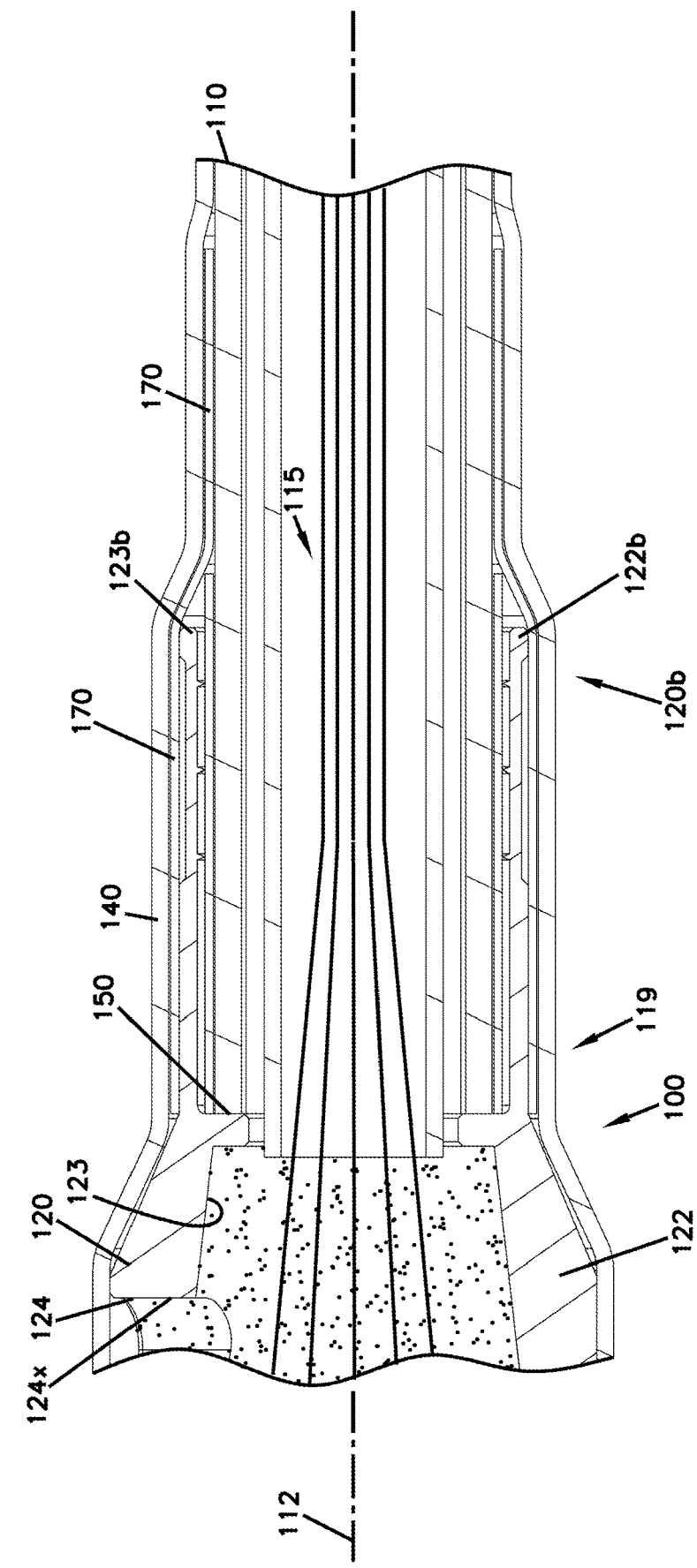
FIG. 3A is an enlarged, schematic, fragmentary, cross-sectional view of a portion of the cable fanout conduit arrangement depicted in FIG. 3.

FIG. 3A is an enlarged fragmentary view of a portion for FIG. 3 discussed below. In FIG. 3A, features previously discussed are viewable including: the cable 110, plurality of fibers 115, and progression of the fibers 115 through the conduit 123.

In FIG. 4, a schematic, fragmentary, cross-sectional view is provided depicting an optional protective cover 140 for a portion of the cable fanout conduit arrangement 119 depicted in FIG. 3. When cable fanout conduit arrangement 100 is assembled, a portion 123x of conduit 123 (FIG. 4A) is accessible through an inspection aperture arrangement 124. The conduit 123 depicted is filled (i.e. appropriately filled) with fixation media 160. The cover 140 is typically applied after the media 160 is inserted, to then close and cover the inspection aperture arrangement 124.

In the example depicted, an internal profile 140i, FIG. 4, of the example cover 140 depicted contours to an exterior profile 119x, FIG. 4A, of the cable fanout assembly 119. In the example, FIG. 4, an exterior profile 140e of the cover 140 also contours to the exterior profile 119x of the cable fanout assembly 119. However, alternatives are possible for each.

In some applications, the cover 140 can comprise a shrink wrap cover. Alternative materials are possible. For example, the cover 140 can comprise a tape that is wrapped around the exterior of the cable fanout assembly 119; or, a cover piece attached to the assembly 119, closing aperture arrangement 124.

In FIG. 4A, underlying structure of the cable fanout assembly 119 in the absence of the underlying cover 140 is shown. Features previously discussed are viewable including: the cable 110, a plurality of fibers 115, the cable fanout assembly 119, conduit 123 and various furcation tubes 118.

II: Example Components; Selected and Preferred Features

A: Example Components; FIGS. 5-12
1. The Cable Fanout Member, FIGS. 5-9

As described previously, the cable fanout assembly 119 includes a cable fanout member 120 and a cable organizing fanout endcap arrangement 130. The cable fanout member 120 is depicted FIGS. 5-9.

Figure 5:
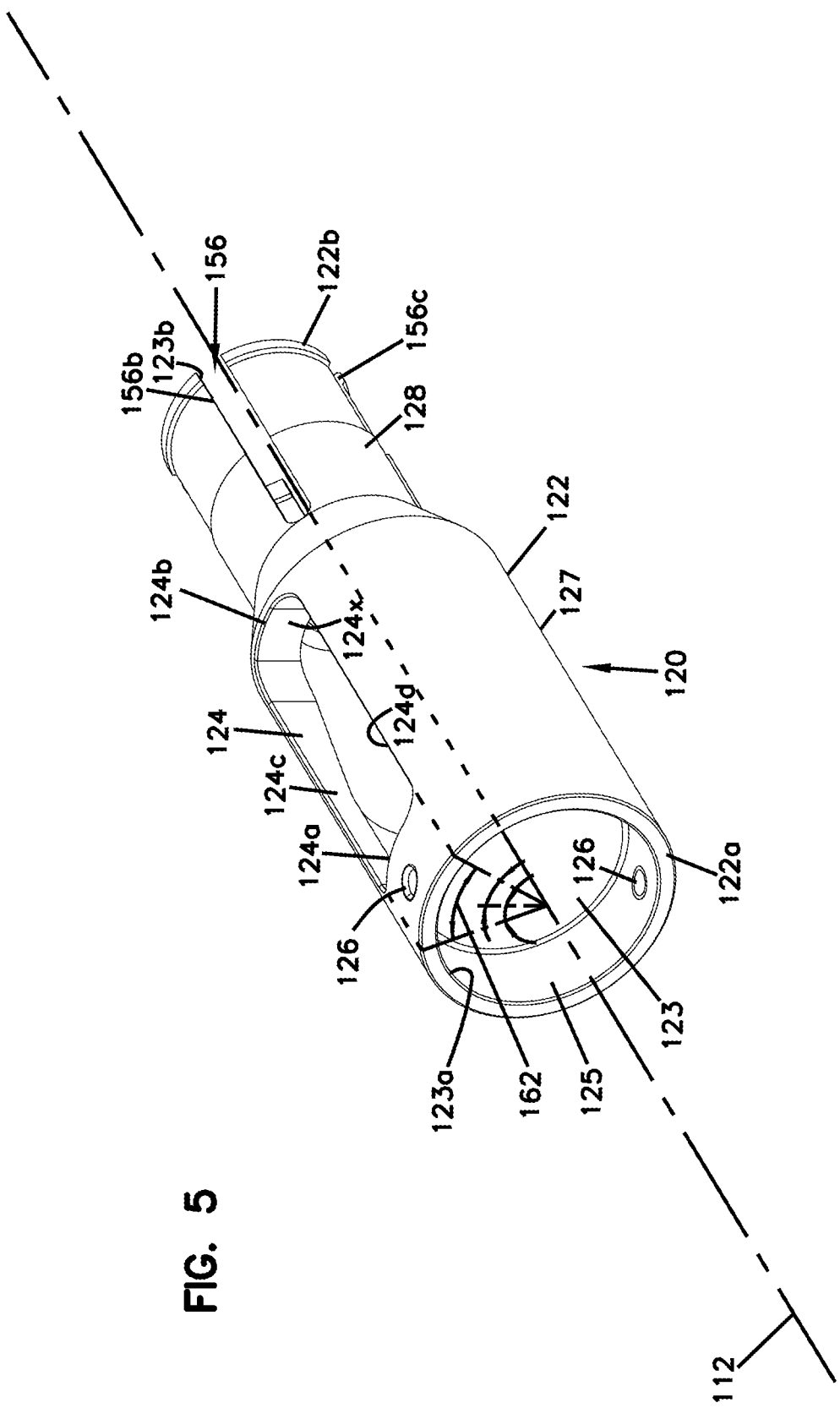
FIG. 5 is a schematic perspective view of a cable fanout member usable in the assembly, depicted in FIGS. 1-3.

Referring to FIG. 5, the cable fanout member 120 comprises the fanout member sidewall 122 extending between opposite ends 122a and 122b. The cable fanout member 120 and the cable fanout member sidewall 122 defines a first section 127 and a second section 128.

In general terms, the first section 127 is positioned adjacent to the end 122a (or similar exit end); and, the second section 128 is positioned adjacent to the opposite end 122b (or cable receiver end). The conduit 123, having opposite ends 123a, 123b, extends completely through the first section 127 and the second section 128. The second section 128 is a cable receiver end, i.e. it is where the cable enters the cable fanout member 120 at end 122b. The first section 127 is where the fibers 115 (FIG. 3) are fanned out (organized). End 122a is where the fibers 115 (FIG. 3) exit during use.

As shown in FIG. 5, in the first section 127, the fanout member sidewall 122 define an inspection aperture arrangement 124. A sufficiently sized inspection aperture arrangement 124 aids a technician in accomplishing fiber management tasks. For example, the inspection aperture arrangement 124, in-use, provides for the following: when the cable fanout member 120 is positioned on the cable 110 as shown in FIG. 3, a technician can perform an examination of the fanned-out fibers. Second, a technician can insert fixation media (or fill) 160 into the conduit 123 (in the first section 127) by passage through the inspection aperture arrangement 124. The fixation media 160 is typically a flowable material that is put into the conduit 123 around the fibers 115 in flowable form and allowed to cure (or harden) to fix and protect the fibers. (Herein when the terms "cure" and/or "harden" are used, no specific reference is meant to the mechanism of the curing or hardening; i.e. a chemical reaction or non-chemical reaction setting).

Referring to FIG. 5, the inspection aperture arrangement 124 has opposite ends 124a and 124b, with end 124a is toward sidewall end 122a and end 124b is toward cable fanout member sidewall end (cable receiver end) 122b. It is noted that the cable fanout member 120 completely surrounds the conduit 123 (and, as a result in use the fibers 115) adjacent at least one, and typically both, of opposite ends 124a and 124b of the inspection aperture arrangement 124.

In many applications, the cable fanout member 120 (and the sidewall 122) will be continuous and integral in extension around the conduit 123 (and in use the fibers 115) adjacent opposite ends 124a and 124b of the inspection aperture arrangement 124. That is, in typical applications the fanout member and the sidewall 122 are integral in their construction around the conduit 123, i.e. they have no seams or joints therein. Such a continuous and integral construction provides structural integrity to the fanout member 120 and fanout member 122, which facilitates assembly and handling. However, alternatives are possible.

In the example depicted, FIG. 5, the inspection aperture arrangement 124 is a single aperture 124x. In some alternative applications, the inspection aperture arrangement 124 can comprise multiple openings. Alternatives are possible.

Still referring to FIG. 5, it is noted that in addition to ends 124a, 124b, the inspection aperture arrangement 124 includes opposite sides 124c, 124d. The inspection aperture arrangement 124 can be characterized as having a "maximum width-dimension" corresponding to a maximum dimension between the sides 124c, 124d, taken generally perpendicular to the central axis 112. Typically, this maximum width-dimension is selected so that the conduit 123 has a greater width thereacross, also in a direction perpendicular to axis 112 that is greater than the maximum width-dimension of the aperture arrangement 124. Alternately stated, preferably sides 124 of arrangement 124 reflect portions of the section 127 that have sides above conduit 123 to help contain fill 160, during use. Preferably, a ratio of the maximum width-dimension of the aperture arrangement 124 to the maximum width-dimension of the conduit arrangement 123 interiorly from the inspection aperture arrangement 124 (each taken perpendicular to the axis 112) is no greater than 0.9, usually no greater than 0.8.

It is also noted, referring to FIG. 5, that a maximum length dimension of the aperture arrangement 124, in direction corresponding to the central axis 112 (i.e. a dimension corresponding to the distance between ends 124a, 124b) is greater than the maximum width-dimension (i.e. dimension between sides 124c, 124d). This is typical in many embodiments in which the section 127 is circular in cross-section. However, alternative cross-sectional shapes are possible, and in some instances, the width-dimension may be greater than the length-dimension. Typically, a ratio of the maximum length-dimension of the inspection aperture arrangement 124 to a maximum width-dimension of the inspection aperture arrangement 124, the dimension being defined as discussed above, is at least 1.5, often at least 2.0, usually at least 2.5, and in some instances, at least 3.0.

More generally, as discussed above, the inspection aperture arrangement, especially when it is a single aperture, can be provided with a variety of shapes. In the example depicted, the maximum length, in a direction corresponding to the central axis 112, is the maximum cross-dimension, and typical length/width ratios were discussed above. These will be typical, especially when the aperture arrangement 124 is a single aperture 124x having, for example, a generally rectangular configuration (with rounded corners). As indicated, however, with alternate shaped sidewalls 122, especially when it is the first section 127, there may be instances in which the length of the inspection aperture arrangement, in the direction corresponding to the central axis 112 is actually shorter than the maximum width-dimension perpendicular thereto. Typically, the ratio of maximum length-dimension (in the direction of the central axis, to a maximum width-dimension perpendicularly thereto, will be within the range of 1:5 to 5:1, inclusive, typically within the range of 1:4 to 4:1, inclusive, although alternatives are possible.

Figure 6:
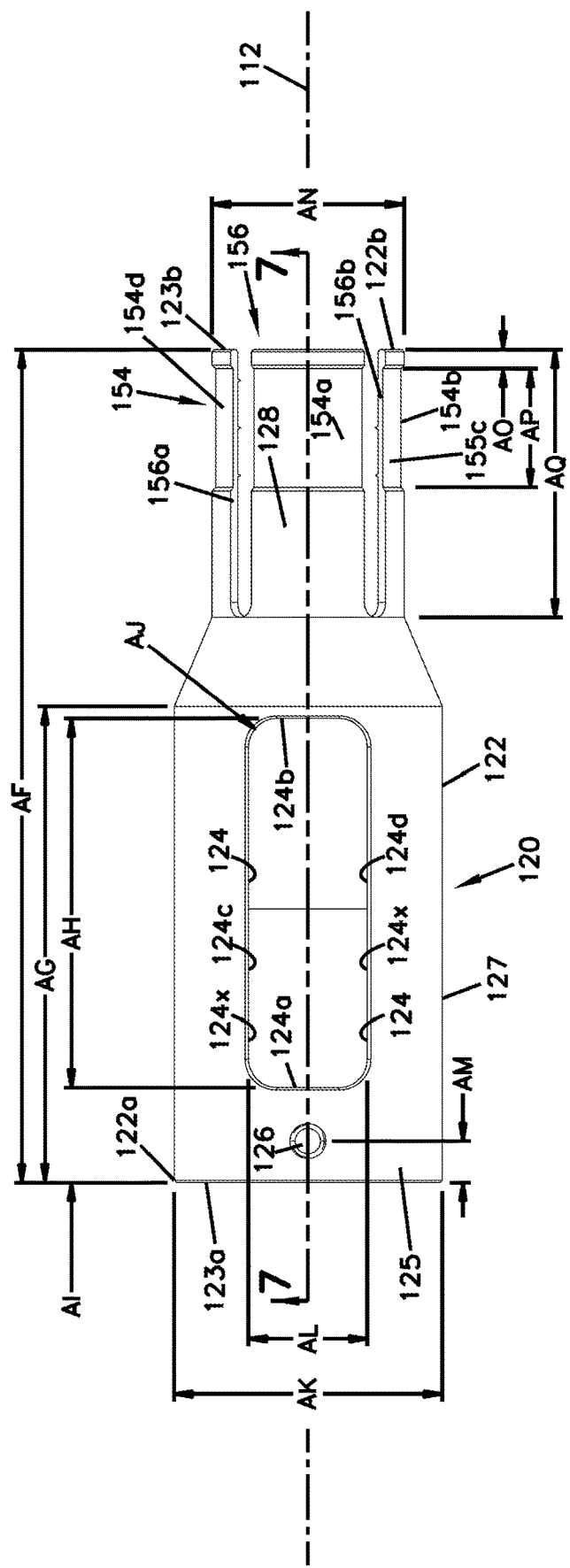
FIG. 6 is a schematic exterior plan view of the cable fanout member of FIG. 5.

The aperture arrangement 124 (whether a single aperture or multiple apertures) can be characterized in accord with a total open area. By the term "total open area" what is meant is the geometric area defined by the aperture arrangement (apertures). In general, the total open area needs to be sufficiently large so that a technician: can observe the fibers 115 passing through the conduit 123 and distribute the uncured fixation media into the conduit 123 and around the fibers 115, FIG. 3. The total open area should not be so large as to place the structural integrity of the cable fanout member 120 at risk. As depicted in FIG. 6, the inspection aperture arrangement 124 is a single aperture 124x having a generally rectangular shape. However, again, alternative geometric shapes are possible.

In an example arrangement configured and proportioned as shown in FIG. 5, typically the total open area will be at least 200 square millimeters (0.31 square inches); usually the total open area will be at least 300 square millimeters (0.47 square inches); and often the total open area will be at least 400 square millimeters (0.620 square inches). In many instances, it will not be larger than 1000 square millimeters, 1.55 square inches), but alternatives are possible.

Referring to FIG. 6, the inspection aperture arrangement 124 is additionally or alternatively definable by a maximum length dimension and a maximum width dimension. In general, the maximum length dimension (corresponding Dimension AH) is a length orientated in the same direction as the central axis 112. The maximum width dimension (corresponding to Dimension AL) is a maximum width taken in a direction perpendicular to the length dimension.

Typically, the maximum length dimension will be at least 20 millimeters (0.79 inches); usually, the maximum length dimension will be at least 25 millimeters (about 1 inch); and often, the maximum length dimension will be at least 30 millimeters (0.620 inches). In many instances, it will not be larger than 100 millimeters (3.94 inches), although alternatives are possible.

Typically, the maximum width dimension will be at least 7 millimeters (0.28 inches); usually, the maximum width dimension will be at least 9 millimeters (0.35 inches); and often, the maximum width dimension will be at least 11 millimeters (0.43 inches). In many instances, it will not be larger than 30 millimeters (1.2 inches), usually not more than 20 millimeters (0.79 inches) but alternatives are possible.

The provided dimensions are related to the depicted embodiment, in alternative examples, where the cable fanout member is a different size, the maximum width dimension and the maximum length dimension can vary from those stated, but the dimensions indicated are typical of a variety of applications.

Referring to FIG. 5, a width of the inspection aperture arrangement 124 can additionally or alternatively be defined by a width-angle 162. As depicted in FIG. 5, the width-angle 162 will be understood to be an angle having a vertex at the center of the conduit 123 and sides extending to opposite sides of the fanout member sidewall 122 at locations corresponding to a maximum width dimension of the inspection aperture arrangement 124. Typically, the width-angle will be at least 20°; usually the width-angle will be at least 35°; and often the width-angle will be at least 40 degrees. In many instances, it will be selected to not be larger than 90°.

Figure 7:
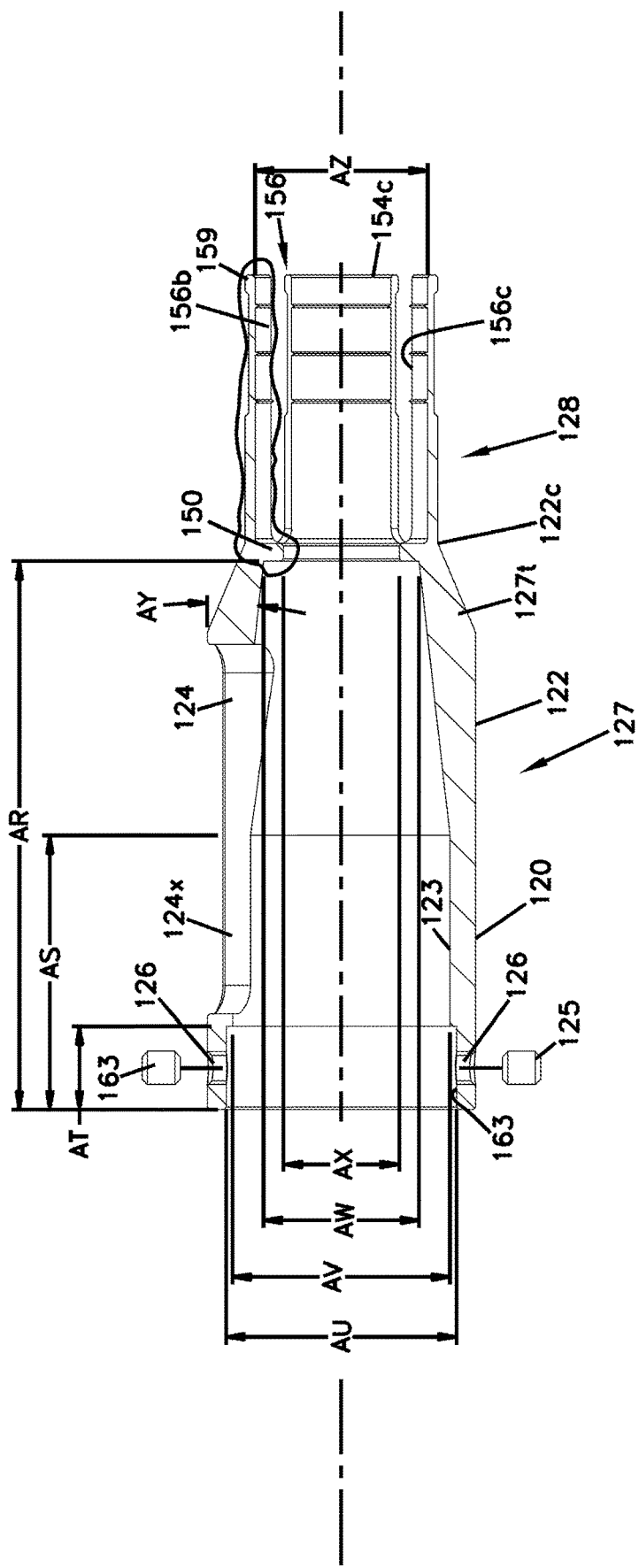
FIG. 7 is a schematic cross-sectional view of the cable fanout member depicted in
FIG. 5.

In referring to FIG. 7, In general, the first section 127 (FIG. 5.) and the second section 128 (FIG. 5) can each be characterized as having a respective maximum internal cross-dimension. In general, the cross-dimension defines an internal distance that spans an internal region of the respective section.

Typically, the maximum internal cross-dimension of the first section 127 is at least 2 millimeters (0.08 inches) greater than the maximum internal cross-dimension of the second section 128; usually, the maximum internal cross-dimension of the first section 127 is at least 3 millimeters (0.12 inches) greater than the maximum internal cross-dimension of the second section 128. In many instances, especially with circular conduits 123, the maximum internal cross-dimension of the first section 127 will not be more than 5 millimeters (0.20 inches) larger than the maximum internal cross-dimension of the second section 128.

As depicted in FIG. 7, when the conduit 123 has a circular cross-section, a largest diameter of the inner surface of the respective section 127, 128 can be a maximum internal cross dimension. However alternative cross dimensions are possible when an internal cross section is not circular. In the depicted example the maximum internal cross dimension of the first section 127 (approximately dimension AV) is greater than the maximum internal cross dimension of the second section 128 (dimension AW). Alternatives with respect to the comparative sizes of the maximum internal cross dimension of the first section and the maximum internal cross dimension of the second section are possible.

In general, selected dimension ratios can be used to address preferred characterizations of the fanout member 120, for example when a specific size or shape differs from the depicted example. For example, in many systems, a ratio determined by the maximum internal cross-dimension of the first section 127 to the maximum internal cross-dimension of the second section 128 is at least 1.0, and usually greater, for example, at least 1.1, sometimes at least 1.2; and, usually not more than 1.4, although alternatives are possible.

Referring to the aperture arrangement 124, especially when it is a single aperture 124x, typically, a ratio determined by the maximum length-dimension (previously defined) to the maximum width-dimension (previously defined) is typically at least 1.5; usually at least 2.0; and often at least 2.5. It will typically not be more than 4.0, in such systems.

Still referring to the aperture arrangement 124, a ratio determined by the total open area of the aperture arrangement 124 to a maximum internal cross-dimensional area of the first section is often at least 0.8 and usually at least 1.0, often at least 1.12, although alternatives are possible.

A ratio determined by the maximum width-dimension of the aperture arrangement 124x to the maximum internal cross-dimension of the first section is often at least 0.4; usually at least 0.5, although alternatives are possible. In a variety of systems, this ratio may be varied.

A ratio determined by the maximum length-dimension of the aperture 124x to the maximum internal cross-dimension of the first section is often at least at least 1.0; usually 1.3; and often at least 1.5, although alternatives are possible.

A ratio determined by the maximum internal cross-dimension of the first section to the maximum internal cross-dimension of the second section is usually at least 1.1 and often at least 1.2, although alternatives are possible.

A ratio determined by the maximum internal cross-dimensional area of the first section to the maximum internal cross-dimensional area of the second section is typically at least 1.2 and usually at least, 1.4, although alternatives are possible.

As shown in FIGS. 5-7, the example fanout member sidewall 122 depicted defines an endcap arrangement receiver 125. The endcap arrangement receiver 125 is located adjacent to the end 122a. The endcap arrangement receiver 125 can be characterized by a cross dimension spanning the conduit 123 at the end 122a of the side wall 122. In general, the endcap arrangement receiver 125 is sufficiently sized to receive therein the endcap arrangement 130. In this context, "sufficiently sized" indicates that dimension AV, FIG. 7, is sufficiently greater than dimension BR, FIG. 12 and dimension AT, FIG. 7 is sufficiently greater than or equal to dimension BO in FIG. 12.

In referring to FIGS. 5-7, the fanout member sidewall 122 at the endcap arrangement receiver 125 defines at least one optional engagement aperture arrangement 126. The optional engagement aperture arrangement can function as an optional securing feature. A fastener 163 can be inserted through the engagement aperture arrangement 126 to secure the fiber-organizing endcap arrangement 130 to the cable fanout member 120. In some examples, a surface defining the engagement aperture arrangement 126 can be threaded to receive a threaded fastener, such as a screw. Referring to FIG. 7, two, opposed, fasteners 163 and apertures 126 are depicted in the example, but alternatives are possible.

The second section 128 of the cable fanout member 120 is defined by a transition to a reduced cross-sectional thickness of the fanout member sidewall 122. Typically, a maximum cross-sectional area of the conduit 123 reduces as the conduit extends from the first section 127 to the second section 128, i.e. in transition region 127t, FIG. 7.

Referring to FIG. 7, a cable abutment member 150 is located adjacent at the fiber fanout end 122c of the second section 128. The cable abutment member 150 provides a barrier or catch for a sheath 114 of a cable 110, FIG. 3, while permitting the plurality of fibers to progress into the first section 127. The cable abutment member 150 extends radially around the conduit 123. The location of the cable abutment member 150 along a direction of extension of the cable fanout member sidewall 122 can be at the transition region 127t between the first section 127 and the second section 128.

Typically, the abutment member 150 will radially extend relative and adjacent portion of section 128, at least 1.5 millimeters (0.06 inches); usually at least 2.5 millimeters (0.1 inches). Typically, the abutment member will not extend radially further than 5 millimeters (0.2 inches), relative to section 129.

When the cable fanout member 120 is a single continuous, integral, piece in extension around the conduit 123, typically the abutment member 150 will also be an integral, continuous, member. In those instances, in which the fanout member sidewall 122 is sectioned, the abutment member 150 may also be sectioned.

The abutment member 150 will typically be located at least 20 millimeters (0.79 inches) from the cable receiver end 122b; usually at least 25 millimeters (1 inch) from the cable receiver end 122. Often, the abutment member 150 will not be located further than 40 millimeters (1.57 inches) from the cable receiver end 122b.

Figure 8:
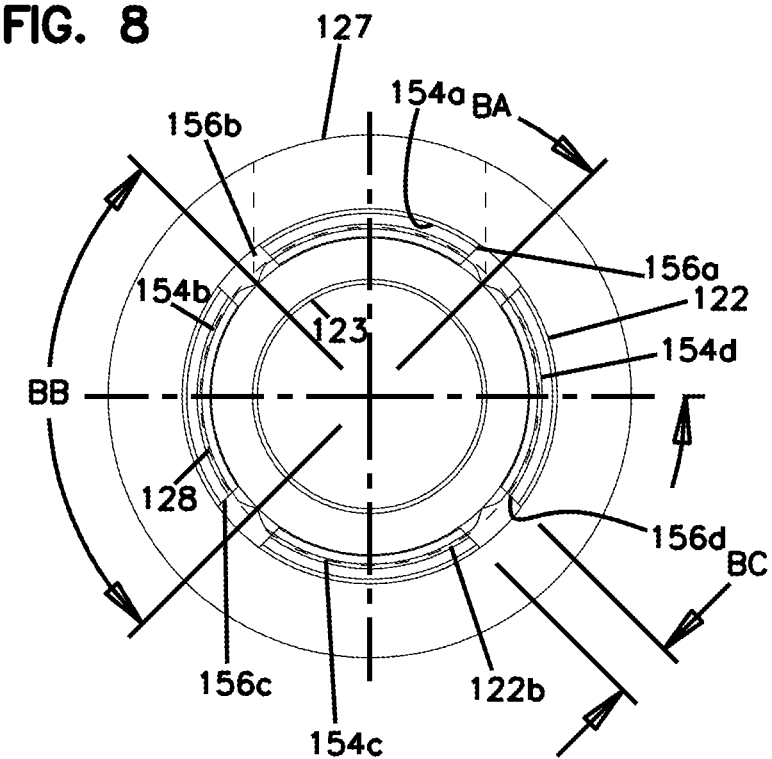
FIG. 8 is a schematic end view of the cable fanout member depicted in FIG. 5; the view of FIG. 8 being taken toward a receiver end of the cable fanout member.

As shown in FIGS. 5, 7 and FIG. 8, end 122b of the second section 128 is discontinuous in extension around conduit 123 and axis 112. In particular there is a slot arrangement 156 (comprising slots 156a-d) defined by the fanout member sidewall 122. A length of each slot 156a-d, of the slot arrangement 156 is, typically, in a direction of the central axis 112, at least 0.7 inch (18 millimeters) usually at least 1 inch (25.4 millimeters). The slots 156a-d can have the same length, but alternatives are possible.

The slots 156a-156b defines a tab arrangement 154 at end 122b of the sidewall 122. The tab arrangement 154 comprises a plurality of tabs 154a-d. As depicted in FIG. 7. The length of each tab 154a-d extends in the direction of the central axis 112.

In FIG. 8, an end view of section 128 is shown, taken toward end 122b and tab arrangement 154. One can see that in the example depicted, there are four slots 156a-156d, defining four tabs 154a-154d. Further, it can be seen that in the example depicted, the slot 156a-156d are evenly spaced around conduit 123; although alternatives are possible. In addition, alternatives to the number of slots and spacing are possible.

Figure 9:
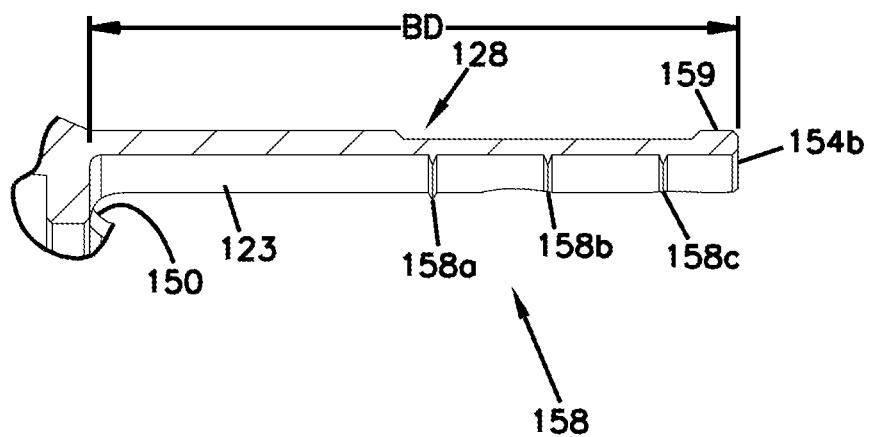
FIG. 9 is a schematic, fragmentary, sectional view of an identified portion of the cable fanout member sidewall depicted in FIG. 7.

FIG. 9 is a partial view of tab 154a depicted in FIG. 7. In referring to FIG. 9 there is a cable grip arrangement 158 along the length of tab 154a. The cable grip arrangement 158 can include a plurality of projections 158a-c directed radially inward towards the conduit 123. Such a grip arrangement can be included on each one of tabs 154a-d.

In general, when a clasping device such as a crimp is used, the cable grip arrangement 158 makes the tabs 154a-d more apt to grip the cable 110 or cable ribbon arrangement due to the mechanical wedge formed by narrowing projections 158a-c, to form an interface set with cable 110. Alternatives to structure of projections are possible.

In referring to FIG. 7 and FIG. 9, at an end of the tab 154a, remote from section 177, is positioned an optional outwardly extending end projection 159. The optional end projection 159 extends upward from the exterior surface of the tab 154. In general, the end projection 159 can provide a securing feature, and can be on each tab. After the cable 110 has been engaged to the cable fanout assembly 119, a crimp or clasping device can be used to secure the cable 110 to the cable fanout assembly 119. The end projection 159 can help keep the crimp or clasping device from sliding off the tab 154 along the central axis 112.

2. The Endcap Arrangement 130 FIGS. 10-12

Figure 10:
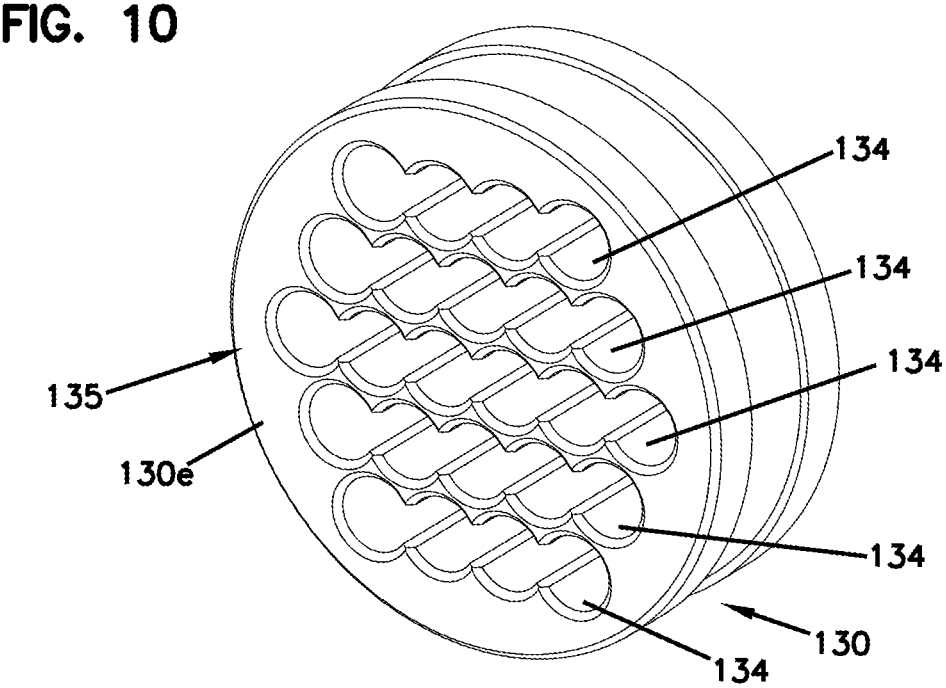
FIG. 10 is a schematic perspective view of an endcap component depicted in the assembly of FIGS. 1-3.
Figure 11:
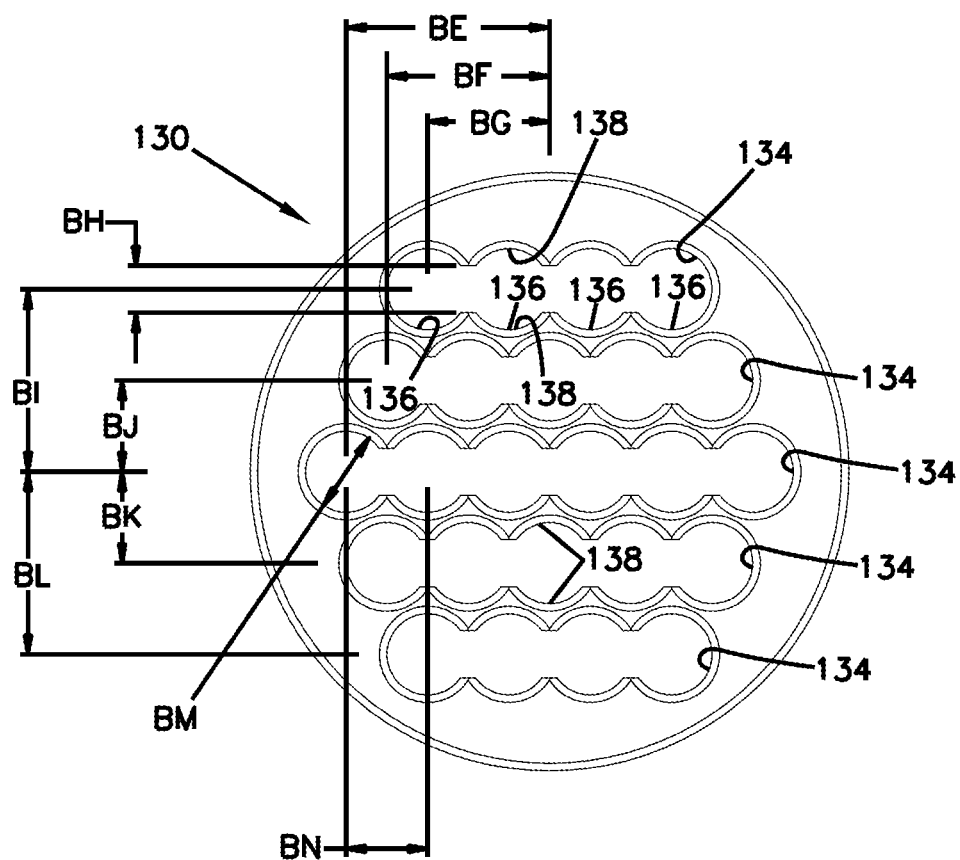
FIG. 11 is a schematic end view of the endcap component depicted in FIG. 10.
Figure 12:
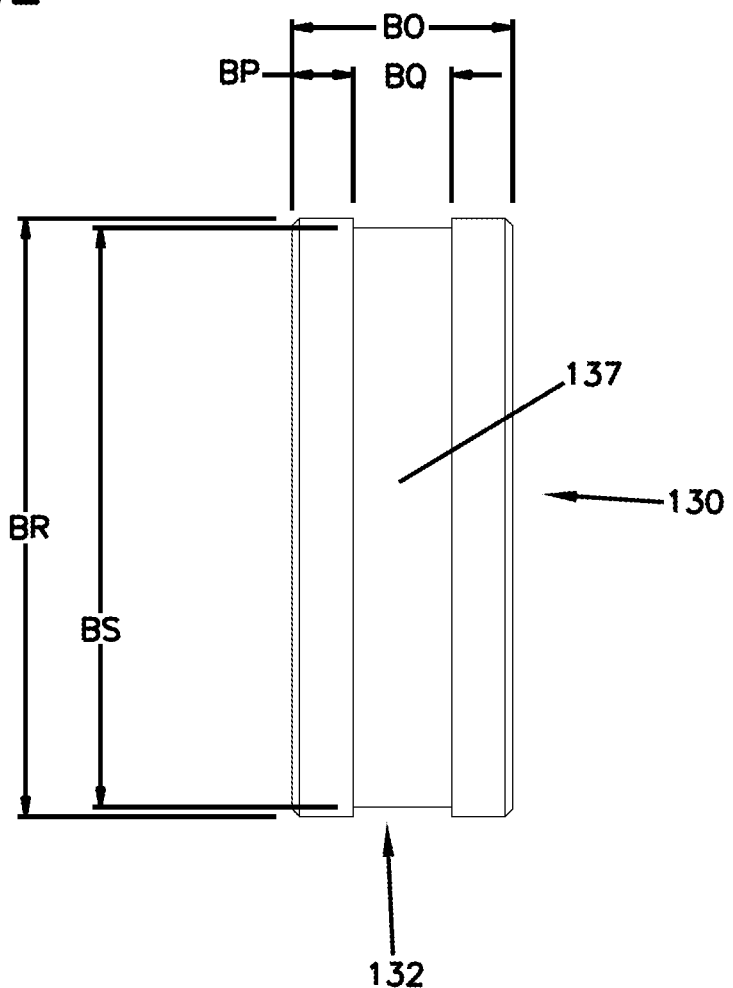
FIG. 12 is a schematic side view of the endcap component depicted in FIG. 10.

As generally depicted in FIGS. 10-12, the fiber-organizing endcap arrangement 130 includes an exterior surface 130e; surface 130e being a surface facing away from section 128, in use. As previously discussed, the endcap arrangement 130 defines a tube-organizing aperture arrangement 135 that includes a plurality of tube-organizing apertures 134. As depicted in FIG. 10, the example tube-organizing apertures 134 are arranged in a portion of parallel apertures, although alternatives are possible.

Referring to FIG. 11, each tube-organizing aperture 134 depicted is configured to be a plurality of tube organizing grooves 136, although alternatives are possible. The tube grooves 136 are defined by opposite recesses 138. The grooves 136 can be varied in geometric shape and are not limited to defining circular receivers. The grooves 136 can also be alternately configured to engage a plurality of furcation tubes 118 rather than a single furcation tube 118, FIG. 1.

The example fiber-organizing endcap arrangement 130, FIG. 12, comprises an endcap peripheral sidewall 132. The peripheral sidewall 132 defines an engagement recess 137. The engagement recess 137 is oriented in the sidewall 132 to align with the engagement aperture arrangement 126, when installed (FIG. 3). In general, a fastener 163 (FIG. 7) such as a set screw is placed in the engagement whole 126. The fastener 163 contacts an edge of the peripheral sidewall 132. The depth of the engagement 137 recess is of sufficient depth to reduce the endcap arrangement 130 from sliding or disengaging the endcap arrangement receiver 125.

In the example depicted, the fiber-organizing cap arrangement 130 has a circular outer perimeter. Alternatives are possible. Also, in the example depicted, the recess extends completely around the perimeter, although alternatives are possible.

The example recess arrangement 137 depicted in FIG. 12 and referenced above, will be particularly convenient when: the fanout member sidewall 122 comprises a single integral piece; and, the sidewall 122 is generally circular in peripheral definition. Alternate methods of connecting the end cap arrangement 130 to the sidewall arrangement 120 can be used, in other applications.

B. Dimensions of an Example Usable System

In the various figures depicted, example dimensions are indicated. These example dimensions are meant to indicate a workable system and components. A wide variety of alternate sizes and alternate dimensions can be used with principles characterized herein.

Referring to FIG. 3, dimensions indicated are as follows: dimension AA=5.0 in. (127 millimeters); Dimension AB= (for example) 8 ft. of cable (2.44 meter); Dimension AC=2.0 in. (50.8 millimeters); Dimension AD=1.25 in. (31.75 millimeters). Dimension AE=0.1 in. (2.54 millimeters).

Referring to FIG. 6, dimensions indicated are as follows: Dimension AF=3.5 in. (88.9 millimeters); Dimension AG=2.0 in. (50.8 millimeters); Dimension AH=1.55 in. (39.37 millimeters). As depicted Dimension AH represented the maximum length-dimension of the inspection aperture 124x. In a variety of systems, this dimension may vary. Further, dimensions indicated in FIG. 6 are as follows: Dimension AI=0.4 in. (10.16 millimeters); Dimension AJ=0.12 in. radius (3.05 millimeters); Dimension AK=1.125 in. (28.58 millimeters); Dimension AL=0.5 in. (12.7 millimeters). As depicted, Dimension AL represents the maximum width-dimension of the inspection aperture 124x. In a variety of systems, this dimension may vary. Further, dimensions indicated in FIG. 6 are as follows: Dimension AM=0.175 in. (4.45 millimeters); Dimension AN=0.807 in. (20.5 millimeters); Dimension AO=0.08 in. (2.03 millimeters). Dimension AP=0.50 in. (12.7 millimeters); Dimension AQ=1.125 inches (28.575 millimeters).

As depicted Dimension AQ represents the length of a representative slot 156a in the slot arrangement 156. In a variety of systems, this dimension may vary.

Referring to FIG. 7, the dimensions are as follows: Dimension AR=2.3 in (58.4 millimeters); AS=1.15 in. (29.2 millimeters); Dimension AT=0.35 in. (8.89 millimeters); Dimension AU=0.965 in. (24.51 millimeters); Dimension AU represents a maximum internal cross-dimension of the first section 127. In a variety of systems, this dimension may vary. Dimension AV=0.91 in. (23.1 millimeters). Dimension AW=0.65 in. (16.5 millimeters). AX=0.484 in. (12.29 millimeters). The difference between Dimension AW and Dimension AX represents the length that the cable abutment member 150 radially extends to the conduit 123. AY=6.4°. Dimension AZ=0.722 in. (18.34 millimeters). The difference between Dimension AN (FIG. 6) and Dimension AZ represents the length that the outward projection 159 outwardly extends from the tab 154a. Typically, the further Dimension AZ represents a maximum internal cross-dimension of the second section 128. In a variety of systems, this dimension may vary.

Referring to FIG. 8, the dimensions are as follows: Dimension BA=45°. Dimension BB=90°. Dimension BC=0.125 in. (3.18 millimeters).

In FIG. 9, Dimension BD=1.125 in. (28.58 millimeters). Dimension BC represents the width of a representative slot in the slot arrangement 156. In a variety of systems, this dimension may vary. Dimension BD represents the length of a representative tab (for example tab 154a) in the tab arrangement 154. Similarly, Dimension BD represents the distance that the cable abutment member 150 is inset from the cable receiver end 122b. In a variety of systems, this dimension may vary.

Referring to FIGS. 11-12, dimension BE=0.323 in. (8.20 millimeters). Dimension BF=0.258 in. (6.55 millimeters). Dimension BG=0.194 in. (4.93 millimeters). Dimension BH=0.075 in. (1.91 millimeters). Dimension BI=0.290 in. (7.37 millimeters). Dimension BJ=0.145 in. (3.68 millimeters). Dimension BK=0.145 in. (3.68 millimeters). Dimension BL=0.290 in. (7.37 millimeters). Dimension BM=0.129 in. diameter (3.28 millimeters). Dimension BN=0.129 in (3.78 millimeters).

In FIG. 12, Dimension BO=0.35 in. (8.89 millimeters). Dimension BP=0.097 in. (2.46 millimeters). Dimension BQ=0.156 in. (3.96 millimeters). Dimension BR=0.95 in. (24.13 millimeters). Dimension BS=0.92 inches (23.37 millimeters).

III: Methods of Use: Generally

The operations described may be carried out or performed in any suitable order to achieve the desired results. Additionally, in certain applications, at least a portion of the operations may be carried out in together (i.e. at the same time).

Referring to FIGS. 3 and 3A, a typical example method initiates with a user operably engaging an optic fiber cable 110 (that includes a plurality of fibers 115) with a cable fanout member 120, for example by inserting the cable 110 into end 122b. Typically, prior to inserting the cable 110 into a cable receiving end 122b, a section of the protective sheath 114 is removed to uncover ends of the fibers 115.

During engagement, the cable 110 is positioned into the conduit 123 of the cable fanout member 120, until further insertion of the cable 110 is impeded by optional abutment member 150. The fibers 115, however, are allowed to progress through the conduit 123 to pass through the first section 127.

After the cable is engaged by cable fanout member 120, the plurality of fibers 115 traverse from the second section 128 of the cable fanout member 120 through the first section 127. The fibers 115 are fanned out in the first section 127, typically facilitated by the lack of a restriction due to removed sheath 114 in the first section and passing through the fiber organizing endcap 130.

To facilitate passing the fibers 115 beyond the cable fanout member 120, the fiber-organizing endcap arrangement 130 is assembled by engaging the furcation tubes 118 with grooves 136, for example with adhesive. Typically, before the fiber organizing endcap arrangement 130 is put on the cable fanout member 120, the fibers 115 are passed through the fiber organizing substructures 116. Then, the fiber organizing endcap arrangement 130 is put into proper engagement with the receiver 125 of the cable fanout member.

Engaging the fanout member 120 with the fiber-organizing endcap arrangement 130 typically includes securing the fanout assembly to the fiber-organizing endcap arrangement using the fastener 163. The fastener 163 secures the endcap arrangement 130 by passing through an engagement aperture arrangement 126 in the fiber-organizing endcap arrangement receiver 125. The fastener 163 may comprise for example a set of fasteners 163. The fasteners 163 further secure the endcap arrangement 130 by engaging a recess 137 in the peripheral sidewall 132 of the endcap arrangement 130.

Typically, after the fiber-organizing endcap arrangement 130 is engaged and secured to the fiber-organizing endcap arrangement receiver 125, the conduit region of the first section 127 is filled with an uncured (unhardened) fixation media 160. A typical fixation media may comprise a flowable epoxy material. After insertion, the fixation media 160 is allowed to cure or harden. A protective covering 140 is can be applied to cover an exterior of the cable fanout assembly 119.

Proper engagement of the cable 110 may involve additional processes. For example, once the cable 110 is properly inserted in the cable fanout member 120, the member 120 can be secured to the cable 110 by applying a crimping force to the tab arrangement 154, to provide an interference fit. When the force is applied, the cable grip arrangement 158 is pressed into the sheath 114.

Proper engagement of the cable may be facilitated by additional layering of material (such as taper or other coverings) to the outer perimeter of the cable 110, to inverse its size for interference. Referring to FIG. 3A, an enlarged schematic, fragmentary, cross-sectional view is provided depicting the cable fanout conduit arrangement 100 depicted in FIG. 1. FIG. 3A is an example embodiment wherein layering is used on the exterior of the cable 110.

In general, the increased outer perimeter of the cable 110 increases the contact (normal force) between the cable grip arrangement 158 and the cable 110, producing a more effective gripping action by a biased cable grip arrangement 158.

Force exerted on the tab arrangement 154 to bias the tab arrangement 154 on the cable 110 can be sustained by a clasping device such as a, band, hose clamp, a restrictive band, or a similarly functioning device positioned in region 155c.

An optional protective layer can be used to cover portions of the cable fanout member 120 once installed.

IV: Some Additional Comments and Observations

A variety of materials can be used for the fanout member and end cap arrangement. The typical material will comprise a brass with an electroless nickel finish.

The flexible furcation tubes 118 can be constructed from a variety of materials. Typically plastic (polymeric) tubing can be used, but alternatives are possible.

Variations from the specific example shapes and configurations depicted are possible. The example depicted, however, will be typical and convenient for use when: cables having a generally circular outer shape and a plurality of circular fibers therein are used.

The invention claimed is:

1. An optic fiber cable fanout conduit arrangement for organizing a plurality of fibers of an optic fiber cable; the fanout conduit arrangement comprising a cable fanout assembly including:
   (a) a fanout member defining a fanout member sidewall and a conduit extending between a first, open, conduit end and an opposite second, open, conduit end along a central axis defined by the fanout member;
      (i) at least a portion of the fanout member sidewall extending completely around the conduit;
      (ii) the fanout member sidewall defining an inspection aperture arrangement therethrough; and,
      (iii) at least one of the first and second, opposite, open conduit ends defining a fiber-organizing endcap arrangement receiver; and,
   (b) a fiber-organizing endcap arrangement operably positionable on the fanout member,
   wherein the inspection aperture arrangement has a first total open area; and
   wherein the fanout member sidewall defines a first section having the inspection aperture therethrough, the first section having a region of first maximum internal cross-sectional area perpendicular to the central axis, a ratio of the first total open area to the first maximum internal cross-sectional area being at least 0.5.

2. An optic fiber cable fanout conduit arrangement according to claim 1, wherein the inspection aperture arrangement includes opposite ends and the fanout member sidewall extends completely around the conduit at a location adjacent each one of the opposite ends of the inspection aperture arrangement.

3. An optic fiber cable fanout conduit arrangement according to claim 1, wherein:
   the inspection aperture arrangement has a smaller, maximum cross-width, in a direction perpendicular to the central axis, than a maximum cross-width of the conduit in the same direction and at a location interiorly from the inspection aperture arrangement.

4. An optic fiber cable fanout conduit arrangement according to claim 3, wherein a ratio of the maximum cross-width of the inspection aperture arrangement to the maximum cross-width of the conduit interiorly from the inspection aperture arrangement is no greater than 0.8.

5. An optic fiber cable fanout conduit arrangement according to claim 1, including a plurality of fiber furcation tubes positioned on the fiber-organizing endcap arrangement.

6. An optic fiber cable fanout conduit arrangement according to claim 1, wherein the inspection aperture arrangement comprises a single aperture, and wherein the single aperture has a first maximum cross-dimension in a first direction, and a second maximum cross-dimension in a second direction perpendicular to the first direction; a ratio of the first, maximum, cross-dimension to the second, maximum, cross-dimension being in the range of 1:5 to 5:1, inclusive.

7. An optic fiber cable fanout conduit arrangement according to claim 6, wherein the single aperture has a rectangular shape with rounded corners.

8. An optic fiber cable fanout conduit arrangement according to claim 6, wherein the single aperture has a largest maximum cross-dimension in a direction parallel to the central axis.

9. An optic fiber cable fanout conduit arrangement according to claim 1,
   wherein the inspection aperture arrangement comprises a single aperture having:
      (i) a maximum length-dimension taken in a direction parallel to the central axis between the first open end and the second open end; and
      (ii) a maximum width-dimension taken perpendicular to the maximum length-dimension;
   wherein the ratio of the maximum length-dimension to the maximum width-dimension is at least 2.0.

10. An optic fiber cable fanout conduit arrangement according to claim 1, wherein the inspection aperture arrangement has a maximum length-dimension in a direction parallel to the central axis, the first section having a first maximum internal cross-dimension perpendicular to the central axis, a ratio of the maximum length-dimension to the first maximum cross-dimension being at least 1.5.

11. An optic fiber cable fanout conduit arrangement according to claim 1, wherein the inspection aperture arrangement has a maximum width-dimension with a minimum width-angle relative to a central axis of at least 20°.

12. An optic fiber cable fanout conduit arrangement, the fanout conduit arrangement comprising a cable fanout assembly, including:
   (a) a fanout member defining a fanout member sidewall and a conduit extending between a first, open, conduit end and an opposite second, open, conduit end along a central axis defined by the fanout member;
      (i) at least a portion of the fanout member sidewall extending completely around the conduit;

(ii) the fanout member sidewall defining an inspection aperture arrangement therethrough; and, (iii) at least one of the first and second, opposite, open conduit ends defining a fiber-organizing endcap arrangement receiver; and, (b) a fiber-organizing endcap arrangement operably positionable on the fanout member, wherein the fanout member includes a first section and a second section, the first section including a region having a first maximum internal cross-dimension perpendicular to the central axis and a region of first maximum internal cross-sectional area perpendicular to the central axis; and the second section includes a region having a second maximum internal cross-dimension perpendicular to the central axis, the first maximum internal cross-dimension being larger than the second maximum internal cross-dimension, the inspection aperture arrangement being in the first section;

wherein the inspection aperture arrangement includes an aperture having a first total open area; and wherein a ratio of the first total open area to the first maximum internal cross-sectional area is at least 0.5.

13. An optic fiber cable fanout conduit arrangement according to claim 12, wherein the inspection aperture arrangement includes opposite ends and the fanout member sidewall extends completely around the conduit at a location adjacent each one of the opposite ends of the inspection aperture arrangement.

14. An optic fiber cable fanout conduit arrangement according to claim 12, wherein the fanout member sidewall defines a conduit region of circular internal cross-sectional shape in the first section.

15. An optic fiber cable fanout conduit arrangement according to claim 12, wherein the second section includes a region having a second maximum internal cross-sectional area perpendicular to the central axis, a ratio of the first maximum internal cross-sectional area to the second maximum internal cross-sectional area being at least 1.4.

16. An optic fiber cable fanout conduit arrangement according to claim 12, including a plurality of fiber furcation tubes positioned on the fiber-organizing endcap arrangement.

17. An optic fiber cable fanout conduit arrangement according to claim 12, wherein the inspection aperture arrangement comprises a single aperture, and wherein the single aperture has a first maximum cross-dimension in a first direction, and a second maximum cross-dimension in a second direction perpendicular to the first dimension; a ratio of the first, maximum, cross-dimension to the second, maximum, cross-dimension being in the range of 1:5 to 5:1, inclusive.

18. An optic fiber cable fanout conduit arrangement according to claim 17, wherein the single aperture has a largest maximum cross-dimension in a direction parallel to the central axis.

19. An optic fiber cable fanout conduit arrangement according to claim 12, wherein the inspection aperture arrangement comprises a single aperture having:

(i) a maximum length-dimension taken in a direction parallel to the central axis between the first open end and second open end; and (ii) a maximum width-dimension taken perpendicular to the maximum length-dimension, wherein the ratio of the maximum length-dimension to the maximum width-dimension is at least 2.0.

20. An optic fiber cable fanout conduit arrangement according to claim 12, wherein the inspection aperture arrangement has a maximum length-dimension in a direction parallel to the central axis, the first section having a first maximum internal cross-dimension perpendicular to the central axis, a ratio of the maximum length-dimension to the first maximum cross-dimension being at least 1.5.

* * * * *